Oct. 18, 1932. E. T. FERNGREN Re. 18,624
METHOD AND APPARATUS FOR DRAWING AND FLATTENING SHEET GLASS
Original Filed March 31, 1924
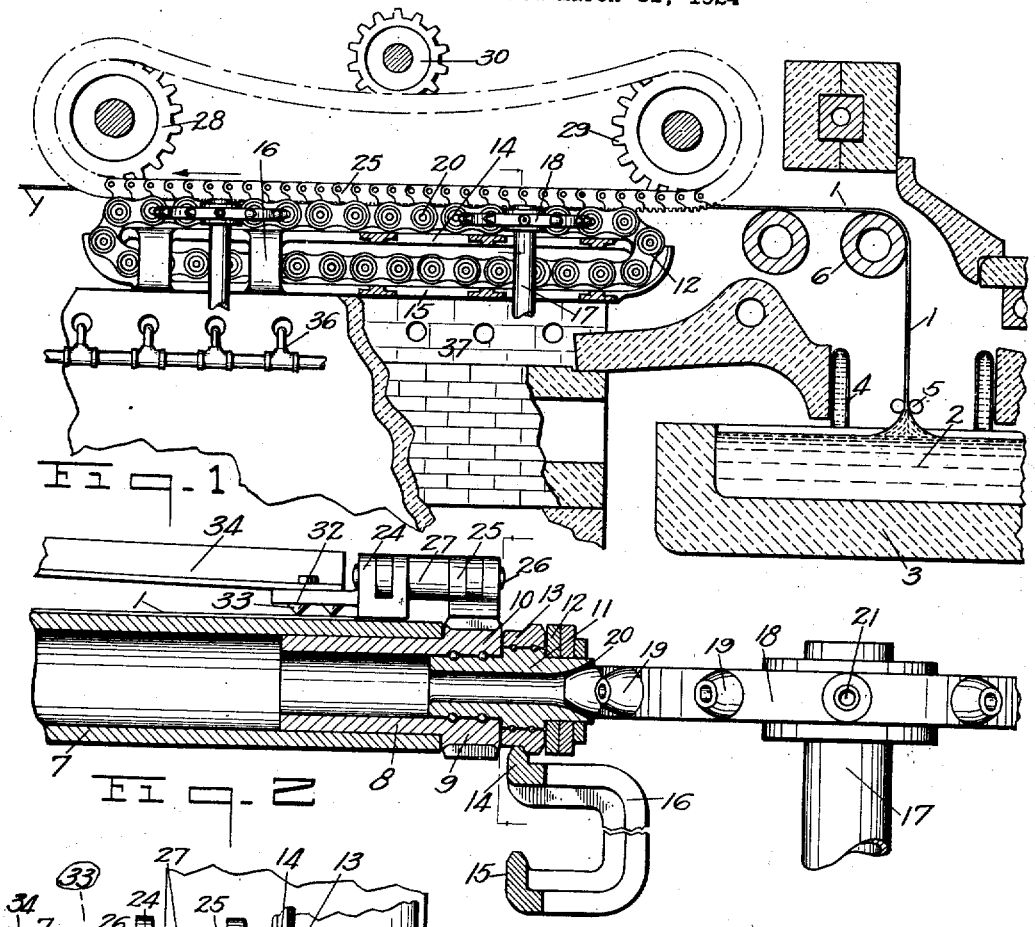
Fig. 1
Fig. 2
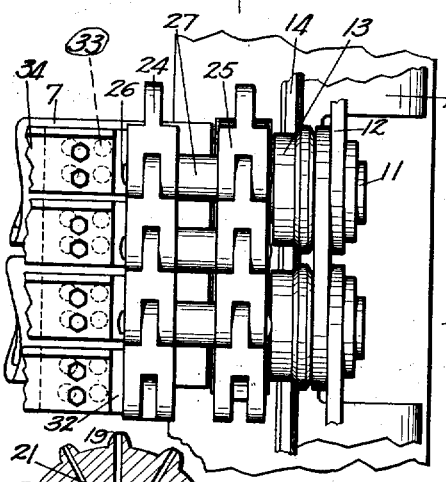
Fig. 3
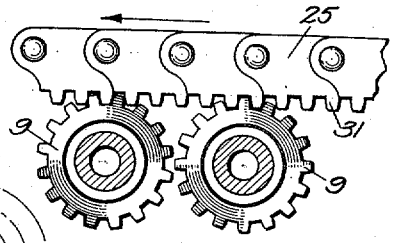
Fig. 4
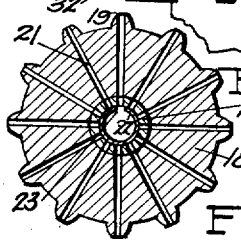
Fig. 5
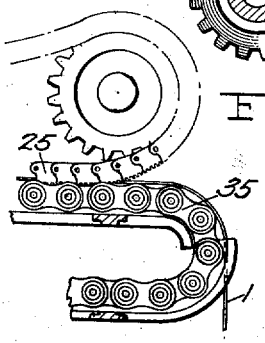
Fig. 6
INVENTOR.
Enoch T. Ferngren.
By C. A. Powley
ATTORNEY.

Reissued Oct. 18, 1932

Re. 18,624

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR DRAWING AND FLATTENING SHEET GLASS

Original No. 1,692,548, dated November 20, 1928, Serial No. 703,031, filed March 31, 1924. Application for reissue filed October 15, 1930. Serial No. 488,952.

This invention relates to the art of drawing sheet glass in continuous sheet form, and more particularly to an improved method and apparatus for continuously pulling the sheet from its molten source and simultaneously flattening the same.

It has been proposed heretofore to support the sheet during the flattening process upon a horizontal table composed of a series of parallel rollers, the rollers usually being driven to act as a conveyor for the sheet. Since the glass sheet must be drawn rather slowly and is still in a rather plastic condition, at least at the beginning of the flattening process, there is a tendency for the sheet to sag between the several lines of support furnished by the plurality of separate rollers.

According to the principles of this invention, the series of supporting rollers for the sheet are mounted in the form of an endless belt and moved bodily beneath the sheet, preferably in a direction opposite to that of the sheet's travel, so as to more rapidly shift the lines of support from one position to another beneath the sheet, thus leaving no portion of the sheet unsupported for any material interval of time and giving it substantially no opportunity to sag. An endless drawing means is mounted above the sheet, engaging the sheet at its edges and moving therewith at the same speed as the sheet. This drawing means acts not only to hold the sheet down on the supporting rollers, but also serves as a means for rotating each of the sheet supporting rollers about its own axis at such a speed that despite the bodily movement of the roller beneath the sheet, it will have only rolling contact with the under surface of the sheet.

The above and other objects and advantages of the invention will be more apparent from the following detailed description of certain approved forms of the apparatus.

In the accompanying drawing:

Fig. 1 is a side elevation, partly in longitudinal vertical section, of the drawing and flattening mechanism and certain portions of the sheet forming mechanism, Fig. 2 is a transverse vertical section on an enlarged scale through one end of one of the supporting rollers, and the adjacent portions of the driving means and sheet-drawing mechanism, Fig. 3 is a plan view of a portion of the drawing mechanism, Fig. 4 is a fragment of the rotating mechanism for the rollers, Fig. 5 is a section through the combined belt driving and roller cooling sprocket wheel, and Fig. 6 shows a portion of a modified form of the apparatus.

In the sheet forming mechanism here shown, the glass sheet 1 is continuously drawn upward from the surface of the molten pool 2 in receptacle 3. The sheet passes up between coolers 4 and the small edge drawing rollers 5, and is then bent, while still somewhat plastic, about the cooled bending roller 6 into the horizontal plane. This means of forming the sheet, which is substantially that disclosed in the Colburn Patent No. 1,248,809, granted December 4, 1917, is merely shown by way of example since the drawing and flattening mechanism about to be described could be used equally well in connection with any sheet forming mechanism which delivers the plastic sheet into the horizontal plane.

The sheet supporting portion of the drawing and flattening mechanism consists of a series of parallel horizontal rollers 7. These rollers, which are comparatively small and mounted as closely adjacent one another as is practicable, are formed of some suitable heat resisting alloy such as nichrome, or Monel metal, capable of taking and retaining a highly polished surface, least apt to injure the fire-polished surface of the glass sheet which will be carried thereby. Each roller 7 is hollow and in each end is secured a short hollow sleeve 8 having formed on its outer end a small gear 9 whose pitch diameter corresponds with the diameter of the sheet supporting surface of roller 7. Sleeve 8 and gear 9 are supported, preferably through roller bearings 10, upon one end of a hollow sleeve 11 which forms one of the connecting pintles of the endless chain 12. Also mounted on pintle 11 is a flanged roller 13, also preferably supported on roller bearings, which travels upon an upper fixed horizontal track or guide 14 or a similar lower guide 15 both carried by the brackets 16 at the sides of the machine. By means of the rollers 13 traveling on the horizontal trackway 14, the upper sheet carrying portions of the peripheries of rollers 7 will always lie in the same horizontal plane throughout the upper sheet carrying run of the endless belt.

Mounted on a hollow vertical driving shaft 17 at the side of the machine is a rather large gear or sprocket 18 having teeth 19 adapted to mesh with the hollow outer end portions 20 of the chain pintles 11. As the driving shaft 17 is rotated from any suitable source of power, the endless chains 11 and rollers 7 carried thereby will be moved bodily along the guides 14 and 15 through an endless orbit. Preferably, there will be two of these driving sprockets 18, one positioned near each end of the loop, so that the endless sheet carrying belt can be driven in either direction as may be desired.

A passage 21 extends from the outer end of each tooth 19 of sprocket 18 to the interior of hollow shaft 17. A fixed sleeve member 22 within shaft 17 has an open slot 23 at one side which will always be opposite the passage 21 leading to the tooth then in engagement with one of the chain pintles 11. Cooling air under pressure is forced through hollow shaft 17 and will be blown out through the slot 23 and passage 21 through the tooth 19 and pintle 11 into the interior of one of the rollers 7 to cool the roller and supporting chain members.

Mounted above the horizontal run of sheet 1 is a drawing mechanism comprising a pair of endless chains adapted to rest upon the edge portions of the sheet, and suitable connecting members whereby the two side chains move in unison. Each of these drawing chains comprises an inner chain of links 24 and an outer chain of similar links 25 having connecting pintles 26 carrying rollers 27 on their central portions between the side links 24 and 25. These rollers 27 are engaged by the teeth of the large sprockets 28 and 29 at the ends of the loop which serve to support and drive the drawing mechanism. A gear 30 meshes with the upper return run of the drawing chain and is so positioned as to prevent excessive slack in this run of the belt and hold the belt positively in engagement with the driving sprockets 28 and 29.

The outer row of links 25 are formed on their lower sides with teeth 31 which constitute, in the lower horizontal run of the drawing chain, a rack which meshes with and drives the gears 9 at the ends of sheet carrying rollers 7. Extending from the inner sides of the inner links 24 are plates 32 having teeth or projections 33 adapted to bear down upon and grip the edge portions of glass sheet 1. Transverse bars 34 bridge the upper surface of glass sheet 1, out of contact therewith, and are secured at their ends to corresponding plates 32. These bars serve to enforce an even movement of the two drawing chains at the two sides of the sheet, and also add the necessary weight to hold these chains positively in engagement with the upper surface of the sheet and with the driving gears 9 for the roller 7.

Driving sprockets 28 will be driven at such a speed that the lower sheet engaging runs of the drawing chains will move forwardly, that is toward the left in Fig. 1, at the proper speed for drawing glass sheet 1 from its source. Driving shafts 17 may be rotated from a separate source of power and at any desired speed to move the sheet supporting roller belt in either direction beneath the sheet surface. We will first assume that this belt is being moved in a clockwise direction, Fig. 1, beneath the sheet, that is so that the upper sheet carrying run of the rollers is moving bodily in a direction opposite that in which sheet 1 is traveling. In this way the greatest relative movement betwen the sheet and rollers is obtained. As each roller moves with relation to the drawing chain 25, the gear 9 at the end of the roller will roll along rack 31 on the lower surface of chain 25 and since the pitch line in which gear 9 engages rack 31 lies in the same horizontal plane as the lower surface of glass sheet 1, the roller 7 will roll along the lower surface of the sheet, no matter at what speed or in which direction it is moved. In this way there can be no sliding contact between the surface of roller 7 and glass sheet 1. The rollers 7 should be bodily moved at such a speed that no portion of glass sheet 1 will remain unsupported long enough to give it time to sag between the rollers. In other words, the lines of support formed by the upper surfaces of the series of rollers are being shifted from place to place so rapidly that practically a continuous support is provided for the lower surface of the sheet. At the same time this supporting surface has an entire rolling contact with the sheet, and there is no sliding engagement which might injure the fire polished surface.

A series of burners indicated at 36, serve to maintain the chamber 37 beneath the sheet carrying table at such a temperature that the glass sheet will not be unduly chilled, or subjected to sudden local temperature changes as it passes on and off of the sheet carrying rollers. The sheet carrying surfaces of these rollers should be maintained at a temperature substantially the same as that of the glass sheet passing thereover. The heated atmosphere in chamber 37, passing up between the rollers 7, which are constantly shifting with relation to sheet 1, has a uniformly distributed heating effect on the lower surface of the glass sheet, maintaining the glass sheet at the proper flattening temperature. The cooling means previously described operating through driving sprockets 18, is for the purpose of preventing overheating of the rollers and the driving and supporting connections at their ends.

In the modified form of the apparatus indicated in Fig. 6, the ends of the loop of the sheet supporting belt 35 are given a larger arc of curvature than in the form previously described, and glass sheet 1 is drawn upwardly from its molten pool and bent into the horizontal plane while supported upon this end loop of sheet carrying rollers 7. In other words, the bending roller 6 previously described is omitted and the endless belt of rollers serves the double purpose of supporting the sheet during the bending operation and afterwards flattening it in the horizontal plane. Otherwise this form of the mechanism operates the same as in the modification first described.

While the invention is disclosed in connection with a draw table, certain features of the invention are not limited to such use.

I claim:

1. In the art of continuously drawing sheet glass, the process of supporting the moving sheet during the flattening period along a plurality of straight parallel lines which are constantly shifting with respect to the sheet to prevent sagging of the sheet between the lines of support.

2. In the art of continuously drawing sheet glass, the process of supporting the moving sheet during the flattening periol along a plurality of straight parallel lines which are constantly moving at a different speed than the sheet to change the supported portions of the sheet.

3. In the art of continuously drawing sheet glass, the process of supporting the moving sheet during the flattening period along a plurality of straight parallel lines which are constantly moving in the opposite direction to the direction of travel of the sheet to rapidly shift the lines of support and prevent sagging of the unsupported portions.

4. A drawing and flattening mechanism for continuously drawn sheet glass, comprising drawing means moving with the sheet, and bodily moving means supporting the sheet at a series of constantly shifting adjacent points.

5. A drawing and flattening mechanism for continuously drawn sheet glass, comprising drawing means moving with the sheet, and a series of rollers supporting the sheet and moving bodily therebeneath.

6. A drawing and flattening mechanism for continuously drawn sheet glass, comprising drawing means moving with the sheet, a series of rollers supporting the sheet, means for bodily moving the rollers beneath the sheet, and means for rotating the rollers about their own axes so that they have only rolling contact with the sheet.

7. A table for supporting and conveying sheet glass, comprising an endless belt having an upper horizontal run on which the sheet is carried, the sheet carrying portion of the belt consisting of a series of rollers, means for driving the belt in a manner to move the rollers bodily relative to the sheet, and means for rotating the rollers on their own axes so that they have rolling contact with the sheet during their bodily movement.

8. A table for supporting and conveying sheet glass, comprising an endless belt having an upper horizontal run on which the sheet is carried, the sheet carrying portion of the belt consisting of a series of rollers, and means for driving the belt and simultaneously cooling the rollers.

9. A table for supporting and conveying sheet glass, comprising an endless belt having an upper horizontal run on which the sheet is carried, the sheet carrying portion of the belt consisting of a series of rollers, and a driving gear having teeth meshing with the ends of the rollers to drive the belt.

10. A table for supporting and conveying sheet glass, comprising an endless belt having an upper horizontal run on which the sheet is carried, the sheet carrying portion of the belt consisting of a series of rollers, a driving gear having teeth meshing with the ends of the rollers, and means for delivering a cooling fluid through the gear teeth to the interior of the rollers in mesh therewith.

11. A drawing and flattening table for continuously drawn sheet glass, comprising an endless belt having an upper horizontal run on which the sheet is carried, the sheet carrying portion of the belt consisting of a series of rollers, an endless drawing means resting on the upper edge portions of the sheet, means for driving this means in the direction of draw and at the same speed as the sheet, means for driving the belt, and means carried by the drawing means for rotating the sheet carrying rollers on their own axes so as to have only rolling contact with the glass sheet.

12. A drawing and flattening table for continuously drawn sheet glass, comprising an endless belt having an upper horizontal run on which the sheet is carried, the sheet carrying portion of the belt consisting of a series of rollers, an endless drawing means resting on the upper edge portions of the sheet, means for driving this means in the direction of draw and at the same speed as the sheet, means for driving the belt, a rack carried by the drawing means, and a gear on each sheet carrying roller meshing with the rack.

13. A drawing and flattening mechanism for continuously drawn sheet glass, comprising a pair of endless chain loops, one at either side of the horizontal run of the sheet, a plurality of sheet carrying rollers rotatably mounted at their ends on the chains, guides for the chains, means for moving the chains along the guides, drawing means resting upon and traveling with the edge portions of the glass sheet, and means carried by the drawing means for rotating the rollers.

14. A drawing and flattening mechanism for continuously drawn sheet glass, comprising a pair of endless chain loops, one at either side of the horizontal run of the sheet, a plurality of sheet carrying rollers rotatably mounted at their ends on the chains, guides for the chains, means for moving the chains along the guides, an endless sheet drawing chain loop having a lower run above each sheet edge, means on the chain engaging the sheet edge, a gear on the end of each roller, and a rack on the drawing chain meshing with the gears.

15. In a conveying table for sheet glass, an endless chain of rollers for supporting the sheet, and means for driving the chain and simultaneously cooling the rollers.

16. In a conveying table for sheet glass, an endless chain of rollers for supporting the sheet, and a driving sprocket meshing with the ends of the rollers to effect bodily movement of said rollers.

17. In a conveying table for sheet glass, an endless chain of rollers for supporting the sheet, a driving sprocket meshing with the ends of the rollers, and means for delivering a cooling fluid through the sprocket teeth to the interior of the rollers engaged thereby.

18. In a conveying table for sheet glass, a pair of endless chain loops, one at either side of the table, a plurality of sheet carrying rollers rotatably mounted at their ends on the chains, means for moving each chain through a fixed orbit, and travelling means for rotating those rollers upon which the sheet is carried about their individual axes.

19. In a conveying table for sheet glass, a pair of endless chain loops, one at either side of the table, a plurality of sheet carrying rollers rotatably mounted at their ends on the chains, fixed guides, means on the chains resting on the guides, means for moving the chains along the guides, and travelling means for rotating those rollers upon which the sheet is carried about their individual axes.

20. In the process of manufacturing sheet glass, that step which consists in supporting and conveying the sheet in a definite predetermined path upon a series of surfaces moving bodily with respect to the sheet in a manner to continually change the point of contact between said surfaces and sheet.

21. In the process of manufacturing sheet glass, that step which consists in supporting and conveying the sheet in a definite predetermined path upon a series of bodily moving surfaces, each having continual shifting contact relative to the sheet.

22. In the process of manufacturing sheet glass, those steps which consist in supporting and conveying the sheet in a definite predetermined path upon a series of rotating surfaces, and in translating said surfaces in respect to the sheet.

23. In the process of manufacturing sheet glass, those steps which consist in forming the sheet, and in receiving on a series of driven rollers the sheet while in a semi-plastic condition, the rollers having a peripheral speed greater than the speed of sheet formation.

24. In the process of manufacturing sheet glass, those steps which consist in forming the sheet, in receiving on a series of driven rollers the sheet while in a semi-plastic condition, and moving the rollers as a whole rearwardly, the rollers having a peripheral speed greater than the speed of sheet formation.

25. In the process of manufacturing sheet glass, those steps which consist in forming the sheet, in receiving on a bed the sheet while in a semi-plastic condition, and in shifting the sheet on the bed, the movement of the sheet relative to the bed being at a speed greater than the speed of sheet formation.

26. In the process of manufacturing sheet glass, those steps which consist in forming the sheet, in receiving on the series of driven rollers the sheet while in a semi-plastic condition, and moving during the period of sheet reception the rollers as a whole in respect thereto, the rollers having a peripheral speed equal to the speed of sheet formation plus the speed of relative shift between the sheet and rollers as a whole.

27. In sheet glass apparatus, means for supporting and conveying the sheet in a definite predetermined path including a series of spaced members, and means for continuously moving said members bodily in respect to the sheet.

28. In sheet glass apparatus, means for supporting and conveying the sheet in a definite predetermined path including a series of bodily moving members, and means for continuously moving said member bodily relative to said sheet so that they have continual rolling contact with the sheet.

29. In sheet glass apparatus, means for supporting and conveying the sheet in a definite predetermined path including a series of rollers supporting the sheet and continuously moving bodily therebeneath and relative thereto.

30. In sheet glass apparatus, means for supporting and conveying the sheet in a definite predetermined path including a series of rollers supporting the sheet, means for bodily moving the rollers beneath the sheet, and travelling means for rotating the rollers about their own axes so that they have rolling contact with said sheet.

31. In sheet glass apparatus, means for supporting and conveying the sheet in a definite predetermined path including a plurality of rollers, and means for translating the rollers in respect to the sheet and in a direction opposite to the direction of movement thereof.

32. In sheet glass apparatus, means for supporting and conveying the sheet in a definite predetermined path including a plurality of rollers, means for translating the rollers in respect to the sheet and in a direction opposite to the direction of movement thereof, and means for simultaneously rotating the rollers about their individual axes in the direction of movement of said sheet.

33. In sheet glass apparatus, means for supporting and conveying the sheet in a definite predetermined path including bodily moving means supporting the sheet, and means for continuously moving said sheet supporting means bodily relative to said sheet so that the sheet is supported thereby at a series of constantly shifting adjacent points.

34. In combination in apparatus for producing sheet glass, a receiver for the glass while it is still in a semi-plastic condition, the glass receiving surface of such receiver being in the form of a series of rollers, means for shifting the receiver with respect to the sheet resting thereupon, and means for rotating during the reception of the sheet the rollers forming the glass receiving surface at a peripheral speed equal to the speed of sheet formation plus the speed of relative shift between the receiver and sheet.

35. In combination in apparatus for producing sheet glass, a receiver for the glass while it is still in a semi-plastic condition, the glass receiving surface of such receiver being in the form of a series of rollers, means for moving the receiver rearwardly during the reception of the sheet, and means for rotating during the reception of the sheet the rollers forming the glass receiving surface at a peripheral speed equal to the speed of sheet formation plus the speed of relative shift between the former and the glass receiving surface.

36. In an apparatus for supporting and conveying a glass sheet, a belt conveyor having a series of glass receiving rollers and having an upper and a lower run, one of which receives the glass sheet thereupon, means for continuously driving the belt in such direction that its sheet receiving run moves rearwardly, and means for rotating the rollers on such run so that their upper surfaces move forwardly.

37. The process of producing sheet glass, which consists in first forming the sheet at a relatively predetermined speed, receiving and carrying the sheet forwardly at a speed substantially equal to its speed of formation upon a series of surfaces revolving in the direction of movement of said sheet, and in effecting bodily movement of said surfaces with respect to the sheet and in a direction opposite to the forward movement of said sheet while continuing the revolving motion of the said surfaces to deliver the sheet therefrom.

Signed at Toledo, in the county of Lucas, and State of Ohio, this 10th day of October, 1930.

ENOCH T. FERNGREN.